United States Patent

[11] 3,625,315

| [72] | Inventor | Bernard Laverdant<br>Vincennes, France |
|---|---|---|
| [21] | Appl. No. | 866,542 |
| [22] | Filed | Oct. 15, 1969 |
| [45] | Patented | Dec. 7, 1971 |
| [73] | Assignee | Societe Anonyme D.B.A. |
| [32] | Priority | Oct. 23, 1968 |
| [33] | | France |
| [31] | | 170938 |

[54] BRAKING CONTROL MEANS
5 Claims, 7 Drawing Figs.

[52] U.S. Cl. .................................................. 188/72.6,
188/106 F
[51] Int. Cl. .................................................. F16d 55/18
[50] Field of Search .......................................... 74/503;
188/72.6, 106 A, 106 F, 167, 216

[56] References Cited
UNITED STATES PATENTS

| 2,532,357 | 12/1950 | Callender et al. | 74/503 UX |
| 3,372,775 | 3/1968 | Beller et al. | 188/72.6 X |
| 3,460,651 | 8/1969 | Burnett | 188/72.6 |
| 3,482,657 | 9/1969 | Zeitrager | 188/106 F X |
| 3,489,251 | 1/1970 | Swift | 188/72.6 |

Primary Examiner—Duane A. Reger
Attorney—C. F. Arens

ABSTRACT: In an emergency and parking mechanical control braking system there is inserted a heavy resilient means between the control lever or pedal and the mechanical braking mechanism of the brakes. Such resilient means is used to store energy restituted to apply the brakes when they are no longer hydraulically applied. The invention applies notably to braking systems comprising tilting caliper disc brakes.

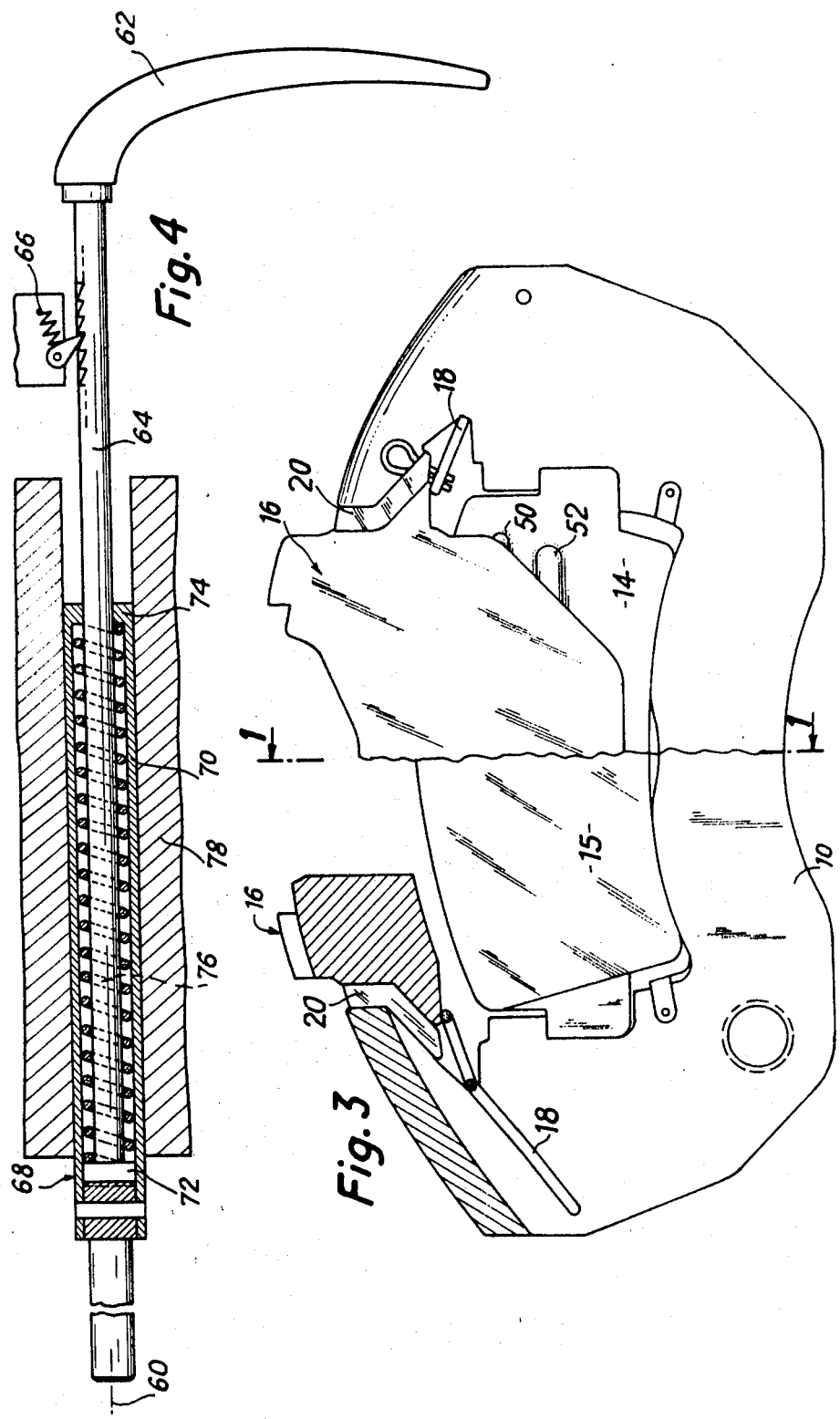

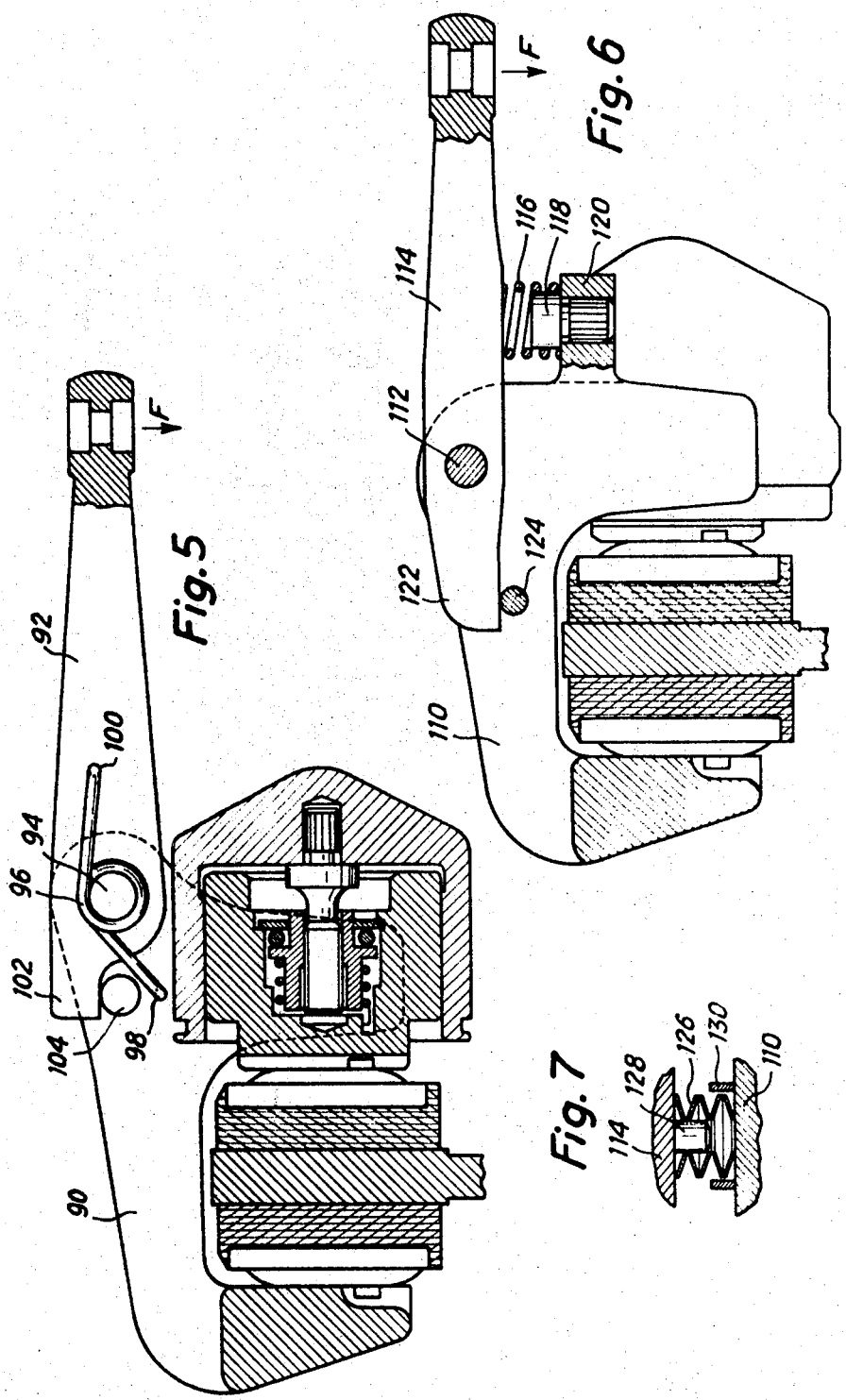

BRAKING CONTROL MEANS

This invention relates to a mechanical brake control means for the emergency and parking braking of a vehicle.

It is already known to have a vehicle emergency and parking braking control means for actuating the control mechanism of at least one of a plurality of brake assemblies adapted to be normally actuated by a vehicle service control system, said control means comprising an operator operated control member provided with operator operated locking means normally preventing release of said control member and force transmitting linkage means between said control member and said control mechanism.

In a mechanical system as defined above the force transmitting linkage is not extensible and even rigid. When the operator acts upon the control member, pedal or hand lever, the linkage means act upon the hand brake mechanism of the brake to apply said brake if it was in its released condition.

If the brake is already in applied condition due to the action of a service braking system—hydraulically for instance—in most of the known brakes the emergency and parking means act together with the service braking system and maintain the brake in applied condition when the service braking ceases to operate. However, this is not the case with brakes such as, for instance, the "twinplex" -type drum brakes or the tilting stirrup disc brakes. With this last named brakes when the service braking system ceases to operate the emergency and parking braking means as defined is not adapted to maintain the brake in applied condition.

The invention has for its object to avoid such a drawback, it proposes a vehicle emergency and parking means such as above defined which is characterized in that relatively heavy resilient means are inserted in said transmitting linkage means between said control member and control mechanism said resilient means being adapted to store energy from said control member.

With such a characterizing feature, when the brakes are applied by the service braking system, upon actuation of the control member of the mechanical control the resilient means provide the storage of a given mechanical power which is restricted to cause the application of the brake when the service braking ceases to operate.

More particularly in the case of a tilting stirrup disc brake with a hydraulic actuator the energy that is stored causes the tilting of the stirrup when the hydraulic pressure disappears.

The invention will now be described by way of example with reference to the accompanying drawings in which:

FIG. 3 shows the brake assembly of FIGS. 1 and 2 half a portion of it being shown in cross section.

FIG. 4 shows the resilient means of a hand brake according to the invention.

FIGS. 5 and 6 show two embodiments of the linking between a tilting lever and the stirrup proper and FIG. 7 shows a modification of the compressed resilient means of FIG. 6.

Figure 1:
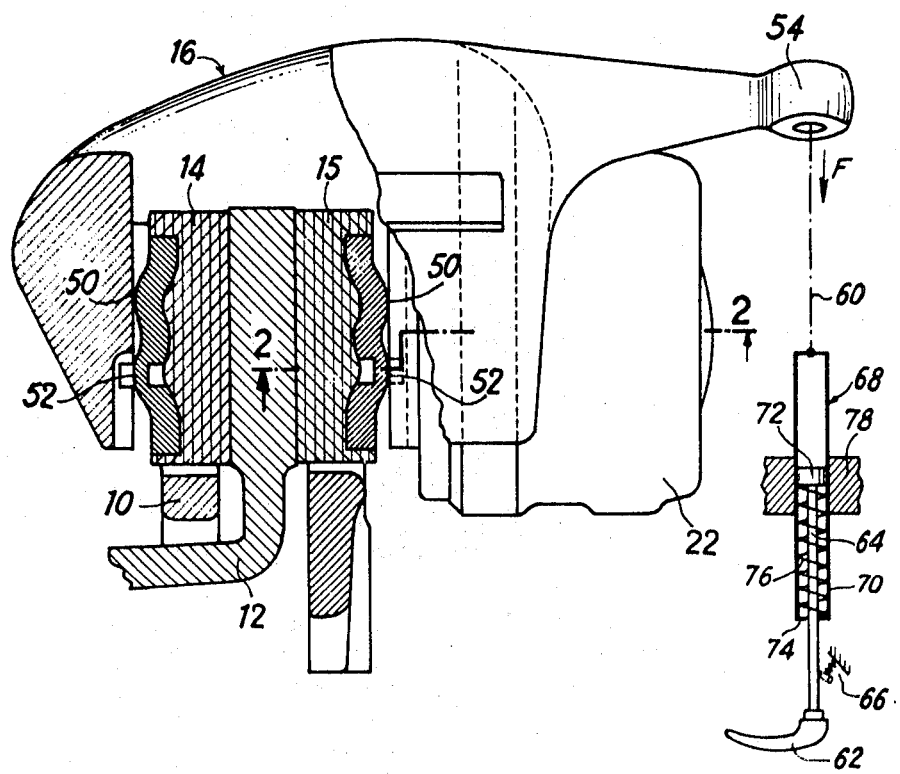
FIG. 1 is a lateral view with radial cross section and parts broken away of a disc brake connected to a braking control means according to the invention which has been shown diagrammatically.
Figure 2:
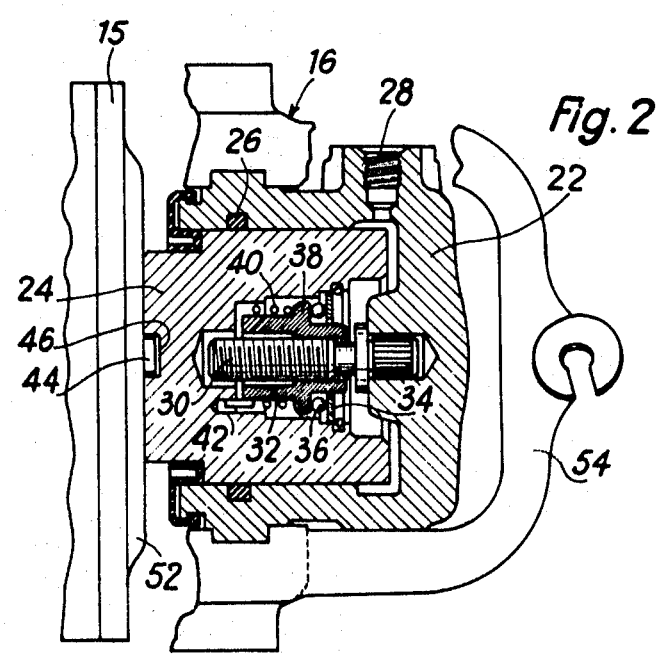
FIG. 2 is a cross section along line 2—2 of FIG. 1.

In FIGS. 1 to 3, there is shown a floating stirrup disc brake associated with a manual control system according to the invention, the latter being shown diagrammatically.

The brake comprises a U-shaped fixed support 10 straddling a disc 12 and comprising a radial opening in which are slidably mounted two pads: 14 and 15 anchoring on the edges of said opening, the squeezing of the pads being effected by means of a stirrup 16 urged by a spring 18 radially toward the outside against guiding members 20 cooperating with the circumferentially opposed edges of the opening provided in the fixed support 10.

In the shown example, the stirrup comprising an actuator 22 connected to said stirrup by means of a tenon-and-mortise-type connection. As shown more in detail in FIG. 3, the actuator 22 comprises a piston 24 sliding in a bore with the interposition of a sealing return ring 26. The hydraulic braking fluid is admitted at 28 between the bottom of actuator 22 and piston 24. Between the piston and the bottom of the actuator 22 is located an automatic adjuster of the unidirectional type. This device, which may be of any type, is in the shown example constituted by a rod 30 solid with the bottom of cylinder 22 the threaded end of said rod carrying a sleeve 32. The thread is of the reversible type and its pitch is very long. The sleeve 32 is capable of limited displacements with respect to piston 24; for this purpose there is provided a washer 34 maintained by a snap ring engaging a groove provided in the wall of the piston. A ballthrust bearing 36 is located between washer 34 and a washer 38 of the sleeve 32, said thrust bearing being provided to facilitate the rotation of the sleeve. A helical spring 40 is wound with a small tightness around sleeve 32 and one of its ends anchors in a recess 42 provided in the piston. The piston is impeded to turn because of the provision of a stud on pad 15 which engages a groove 48 provided in the external face of the piston. Spring 40 constitutes a unidirectional clutch which permits the rotation in the lengthening direction of the assembly, threaded rod - sleeve and opposes the rotation in the opposite direction. The device which has been described efficiently opposes any displacement of the piston toward the bottom of the cylinder as the pads wear.

Two parallel projections or ribs 50 and 52 are provided on the backing plates of pads 14. Laterally with respect to the plane of the disc there is provided on the stirrup 16 a lever arm forming extension 54 at the end of which is connected the manual control means of the brake which will be described herebelow: This control means acts along arrow F to cause the tilting of the stirrup clockwise when considering FIG. 1. One understands that during such a tilting the reaction arm on the stirrup 16 is applied against ribs 50 of pad 14 whereas the piston 24 which cannot move backward because of the automatic adjuster is brought against the rib 52 of the pad 15 which results in a squeezing of pads 14 and 16 against the opposite faces of the disc 12.

There has been diagrammatically shown at the right side of FIG. 1 a transmission system according to the invention, the free end of lever 54 of the stirrup 16 is connected by means such as linkage means or cable (diagrammatically shown by the phantom line 50) to a control handle of a conventional type 62 located at the end of a sliding rod 64 which cooperates with ratchet means 66 of a known type which has to be released to unlock the control system with a view to releasing the brake. According to the invention, there has been provided in a transmission system resilient means designated by the general reference 68. These means comprise a cylinder 70 in which is slidably mounted a piston 72 solid with the end of rod 64 which passes through the bottom 74 of the cylinder. A compression spring 76 is slipped on the rod 64 to take support against the piston 72 and the bottom 74 respectively. There has been shown at 78 a fixed portion of the vehicle on which cylinder 70 is slidably mounted.

The operation of the control system of FIG. 1 is as follows:

If the pressure is not applied to the wheel cylinder, the pulling of the handle 62 directly causes the tilting of the stirrup 16 in the direction of arrow F which results in the manual application of the brake, this spring 76 having a force which is such that the resilient means 68 behave as a rigid rod located in the transmission system or is only submitted to a very slight lengthening.

If the hydraulic pressure is still applied to the brake actuator when the driver pulls on the handle 62, this pulling action on piston 72 causes the compression of spring 76 which remains in a compressed condition thanks to the provision of ratchet 66. When the pressure ceases to be applied to brake actuators, spring 76 is released, transmission system shortens and stirrup 16 is tilted in the direction of arrow F.

In conclusion, the resilient means 68 located in the transmission system behaved as tensilespring which in fact could be substituted thereto.

There has been shown in FIG. 4 a practical embodiment of the device diagrammatically shown in FIG. 1. The same reference numbers have been used in both figures. At the left side of FIG. 4, there has been shown a link member which is a part of the transmission system 60 connected by a pin to the end of the cylinder 70 opposed to bottom 74.

In FIGS. 5 and 6, there has been represented in radial cross section two disc brakes, the stirrups of which comprise a hinged lever, a resilient means according to the invention being located in the articulation between the stirrup proper and the lever.

The brake of FIG. 5 comprises a stirrup 90 on which is pivotally mounted a lever 92 through the intermediary of an axle 94. A spring 96 is wound on axle 94, the ends 98 and 100 of which are anchored in the body of stirrup 90 and in the lever 92 respectively. The spring acts on lever 92 in such a manner that the latter be urged in a counterclockwise direction when considering FIG. 5, and is brought in abutment by its projection 102 against a stop part 104 carried by stirrup 90.

The brake of FIG. 6 comprises a stirrup 110 having a pivot 112 on which is articulated a lever 114. A compression spring 116 slipped on a pin 118 carried by a projection 120 of stirrup 110 urges lever 114 pivotally clockwise when considering FIG. 6, to bring the end 122 of the lever in abutment against a stop member 124.

According to a modification shown in FIG. 7 in partial view, Belleville washers 126 may be substituted for spring 116, these Belleville washers are maintained by a stud 128 solid with lever 114 and a cylindrical ring 130 solid with the stirrup 110.

Each of the brakes shown in FIGS. 5 and 6 has the free end of its lever, hingedly connected to the stirrup, which is connected to the conventional hand brake transmission system adapted to urge the lever in the tilting direction of arrow F shown on both figures.

The operation which is the same for the brake of FIGS. 5 and 6 is the following:

When the hydraulic pressure does not exist in the brake actuator, the conventional transmission system causes the tilting of the stirrup, the spring (96 or 116–126) directly transmitting the force applied by the transmission to the body of the body (90 or 110) with a possible slight deformation of the spring.

If the brake is hydraulically applied, the tension in the direction of arrow F does not permit the tilting of the stirrup which is not movable with respect to the disc because of the pressure acting on the pads. The tilting of the body of the stirrup (90 or 110) does not occur, but the lever (92 or 114) pivots against the resilient force of the spring (96 or 116–126). The hand brake control system being locked by means of the ratchet or the like, the resilient means between the lever and the stirrup remain loaded to cause the tilting of the stirrup and the application of the brakes manually as soon as the hydraulic pressure is released.

Of course the invention is not limited to the embodiments described and shown which have been given only as example

I claim:

1. In a vehicle:
a brake having a service actuator responsive to pressurized fluid and a parking actuator;
a parking control lever mounted in the vehicle operator's compartment; and
force-transmitting means operatively connecting the lever with the parking actuator;
said force-transmitting means including resilient means compressed by movement of said lever while pressurized fluid is admitted to said service actuator, said resilient means elongating to actuate the parking actuator without further movement of the lever when the service actuator is released, said resilient means being sufficiently strong to transmit movement of the lever to the parking actuator without substantial deformation of the resilient means when the lever is moved while the service actuator is released, said force transmitting means further including first and second coaxial members, one of said members being connected to said lever and movable therewith, the other of said members being connected to the caliper and movable relative to said one member and to said lever, said resilient means being disposed between said first and second members and yieldably urging said first and second members apart.

2. In a vehicle:
a rotor having a pair of friction faces;
a pair of friction elements, one of said friction elements being disposed adjacent each of said friction faces;
a torque member;
a caliper slidably mounted on said torque member for movement parallel to the axis of rotation and tiltable with respect to said torque member about an axis generally parallel to said friction faces;
service actuating means including a fluid motor responsive to fluid pressure communicated into said caliper for sliding the latter on said torque member to urge said friction elements into braking engagement with their corresponding friction faces to thereby effect a service application;
parking actuating means for tilting said caliper to drive said friction elements into braking engagement with their corresponding friction faces;
said parking actuating means including a lever mounted in the vehicle operator's compartment and force-transmitting means operably connecting the handle and the caliper;
said force-transmitting means including resilient means compressed by movement of said lever during actuation of the service actuating means and elongating to tilt said caliper when the service application is released without further movement of said lever, said resilient means being sufficiently strong to transmit movement of the lever to the caliper without deformation of the resilient means when the lever is moved while the service actuating means is released.

3. The invention of claim 1
one of said members being slidably received within the other of said members, said members cooperating with one another to define a cage for said spring;
said other member having stop means provided on one end thereof, said resilient means yieldably urging said one member into engagement with the stop means.

4. The invention of claim 2
said force-transmitting means including a lever pivotally mounted on said caliper;
said resilient means being disposed between the lever and said caliper.

5. The invention of claim 4; and
stop means limiting pivoting movement of said lever;
said resilient means yieldably urging said lever into engagement with said stop means.

* * * * *